(12) United States Patent
He

(10) Patent No.: US 8,064,473 B2
(45) Date of Patent: Nov. 22, 2011

(54) LOCAL AREA NETWORK

(76) Inventor: Ziqiang He, Danville, CA (US)

( * ) Notice: Subject to any disclaimer, the term of this patent is extended or adjusted under 35 U.S.C. 154(b) by 901 days.

(21) Appl. No.: 11/466,463

(22) Filed: Aug. 23, 2006

(65) Prior Publication Data

US 2007/0047525 A1 Mar. 1, 2007

Related U.S. Application Data

(60) Provisional application No. 60/711,784, filed on Aug. 26, 2005, provisional application No. 60/785,857, filed on Mar. 25, 2006, provisional application No. 60/791,989, filed on Apr. 14, 2006.

(51) Int. Cl.
*H04L 12/28* (2006.01)
(52) U.S. Cl. ........................................................ 370/419
(58) Field of Classification Search .................. 370/352, 370/353, 419
See application file for complete search history.

(56) References Cited

U.S. PATENT DOCUMENTS

| | | | |
|---|---|---|---|
| 6,466,572 B1 * | 10/2002 | Ethridge et al. | 370/352 |
| 6,659,947 B1 * | 12/2003 | Carter et al. | 600/300 |
| 6,764,343 B2 * | 7/2004 | Ferentz | 439/620.01 |
| 7,408,923 B1 * | 8/2008 | Khan et al. | 370/352 |
| 7,583,703 B2 | 9/2009 | Bowser et al. | |
| 2001/0048667 A1 * | 12/2001 | Hamdi | 370/252 |
| 2001/0048679 A1 * | 12/2001 | Czerwiec et al. | 370/352 |
| 2002/0027888 A1 * | 3/2002 | Creigh | 370/282 |
| 2003/0112965 A1 * | 6/2003 | McNamara et al. | 379/399.01 |
| 2003/0137979 A1 | 7/2003 | Hayon et al. | |
| 2004/0067782 A1 * | 4/2004 | Kagan et al. | 455/575.1 |
| 2004/0109554 A1 * | 6/2004 | Mitchell | 379/250 |
| 2005/0245127 A1 * | 11/2005 | Nordin et al. | 439/540.1 |
| 2006/0077891 A1 * | 4/2006 | Smith et al. | 370/220 |
| 2006/0082220 A1 * | 4/2006 | Karam et al. | 307/4 |
| 2006/0250947 A1 * | 11/2006 | Allen | 370/216 |

* cited by examiner

*Primary Examiner* — Derrick Ferris
*Assistant Examiner* — Mohammad Anwar

(57) ABSTRACT

A local area network that includes multiplexing means for establishing out-of-band channels along with corresponding Ethernet channels over shared network cabling; the out-of-band channels are configured dedicatedly for operating an IP telephony system including IP phones; a power sourcing equipment (PSE) may be further provided for remotely supplying power to the IP phones over shared network cabling; and means for access control and device location tracking may be further implemented for the IP telephony system.

4 Claims, 10 Drawing Sheets

LOCAL AREA NETWORK

REFERENCE TO RELATED APPLICATIONS

This application claims priority from U.S. Provisional Patent Application Ser. No. US60/711,784 filed Aug. 26, 2005 entitled "Dual-Switches Based Local Area Network", and U.S. Provisional Patent Application Ser. No. US60/785,857 filed Mar. 25, 2006 entitled "Ethernet Port Combiner", and U.S. Provisional Patent Application Ser. No. US60/791,989 filed Apr. 14, 2006 entitled "Auxiliary Channel Over a 1000Base-T Ethernet Link".

FIELD OF THE INVENTION

This invention relates generally to communication networks. More particularly, this invention relates to a local area network for operating a dedicated network application such as IP telephony over out-of-band channels established on shared network cabling.

BACKGROUND OF THE INVENTION

Today, "Voice over Internet Protocol (VoIP)", also referred to as IP telephony, is adopted for voice communications over an Ethernet local area network (LAN). Compared to operating two separate communication networks, e.g. an Ethernet LAN for data communications and a PBX system for voice communications in an office communication environment, a converged system by applying an Ethernet LAN for both data and voice communications would be highly desirable for saving costs in deploying and operating the converged network infrastructure as well as for providing more tightly integrated data and voice applications.

Nevertheless, there are still technical and operational difficulties and limitations for such implementations because voice and data communications place very different requirements on the network performance. The Ethernet LAN implements a native "best-efforts" technology that was originally designed only for data transmission among computers. For this reason, the Ethernet networking technology in its primitive form does not provide any Qualify of Service (QoS) necessary for voice communications in terms of transmission bandwidth, packet delay, jittering, packet loss and etc. Furthermore, an Ethernet LAN inherently tends to be less reliable and secured than a traditional PBX telephone system does.

For better understanding of the background of this invention, general developments and current applications of Ethernet technology are first discussed.

Ethernet is a computer networking technology that was initially developed in 1970s as a local area networking solution for data communications among data terminal or host devices such as computers, printers, servers and etc within a local area such as an office building. Because of its simplicity and scalability, Ethernet has become the most widely adopted LAN technology and was standardized by IEEE (The Institute of Electrical and Electronics Engineers) as IEEE Standard 802.3, "Carrier sense multiple access with collision detection (CSMA/CD) access method and physical layer specifications".

According to IEEE Standard 802.3, a cable of four twisted pairs, referred to as a LAN cable hereinafter, such as Category 5 cable or the like is used to provide a full-duplex communication link between a network device such as an Ethernet switch and terminal device such as a computer. Typically, the four twisted pairs of the LAN cable are referred to as pair 1-2, pair 3-6, pair 4-5; pair 7-8. A standard 8-conductor RJ45 plug assembled with the LAN cable is usually used for connecting with a standard 8-conductor RJ45 jack. Of variants of Ethernet protocols, 10Base-T and 100Base-TX, referred to as 10/100Base-T hereinafter, refers to transmission of Ethernet data signals at 10 Mbps (bit per second) and 100 Mbps respectively by using pair 1-2 and pair 3-6 of the LAN cable while pair 4-5 and pair 7-8 of the LAN cable are left unused. 1000Base-T refers to transmission of Ethernet data signals at 1000 Mbps by using all the four pairs of the LAN cable.

An Ethernet LAN in the early days was usually found in a shared bus topology by which multiple computers were physically hooked up to a single cable segment, sending and receiving packets to each other based on the communication protocol called "Carrier Sense Multiple Access with Collision Detection (CSMA/CD)" as specified in IEEE Standard 802.3. Today, Ethernet switches are typically used for achieving much higher data throughput with improved network reliability. An Ethernet Switch is a multi-port LAN interconnection device which operates at the data link layer (layer 2) of the network hierarchy (OSI reference model). It allows simultaneous packet communications among multiple pairs or groups of computers.

For the purpose of remotely providing power to terminal devices such as IP phones, the technology of "Power over Ethernet (PoE)" has been developed that enables a unified supply of data and power through a single access point by sending power over a LAN cable. The PoE technology eliminates the need for a separate power cabling and installations of bulky AC adapters and AC outlets. As a matter of fact, such a technology has been standardized as an IEEE standard, referred to as IEEE Standard 802.3af.

According to IEEE Standard 802.3af, a Power Sourcing Equipment (PSE) operating as either a Midspan or Endpoint apparatus provides DC or low frequency inline power over two pairs of a LAN cable to a remote terminal device in one of two modes, referred to as "Alternative A" and "Alternative B". In "Alternative A", pair 1-2 and pair 3-6 of the LAN cable are used as two conducting paths for transmitting inline power as a common mode voltage. Because pair 1-2 and pair 3-6 of the LAN cable are also used for transmitting 10/100Base-T data signals in differential mode, "Alternative A" allows transmission of both power and data signal over the same two twisted pairs. Therefore, "Alternative A" is applicable to both 10/100Base-T and 1000Base-T. In "Alternative B", pair 4-5 and pair 7-8 are solely used as two conducting paths for transmitting inline power as a common mode voltage. Therefore, "Alternative B" is applicable only to 10/100Base-T. According to IEEE Standard 802.3af, a PoE enabled powered device (PD) such as an PoE enabled IP phone shall be able to support both "Alternative A" and "Alternative B". In "Alternative A", the voltage polarity of inline power received by a PD depends on the type of the LAN cable being used which is either a straight-through cable or cross-over cable.

Technically, an IP phone digitizes a channel of analog voice signal, encapsulates the digitized voice signal into a sequence of IP packets that are further carried by Ethernet packets, and the Ethernet packets are sent over an Ethernet LAN to another IP phone. For achieving satisfactory voice quality, the Ethernet LAN is required to be capable of providing adequate QoS.

Two existing Ethernet LAN techniques have been developed for providing QoS and segmenting data traffic within an Ethernet switch which can be utilized to improve the performance of IP telephony communications over an Ethernet LAN. One technique is to prioritize packets inside an Ethernet switch so that packets with higher priority are transferred or forwarded with reduced amounts of packet delay, packet jitter and packet loss. The other technique is to use virtual LAN (VLAN) technique to logically separate data traffic at the data link layer running inside an Ethernet switch so as to provide a higher level of security as well as a more manageable and better guarded bandwidth among various types of data traffic. As a matter of fact, these two techniques of packet prioritization and virtual LAN (VLAN) for switching Ethernet packets have been standardized as an IEEE standard, referred to as IEEE Standard 802.1p/Q.

Although Ethernet switches that are built with the packet prioritization and VLAN mechanism can be used to implement an Ethernet LAN for better supporting IP telephony communications, there are still several technical and operational issues that may impede the wide adoption of this technology. Some of these technical issues are described below.

1) System reliability issue. Running data and voice communications over a single Ethernet LAN is like "putting two eggs into one basket". Once the LAN crashes or becomes paralyzed by malicious attacks of denial of services (DOS), both data and voice communications are lost at the same time.

2) Security issue. Although a VLAN can separate voice traffic from other traffic in a network for implementing a more secured IP telephony system over an LAN, security is still a concern because the VLAN only logically separates voice traffic from other traffic at the data link layer and there are still chances that such a VLAN maybe compromised and voice packets maybe intercepted and eavesdropped.

3) Network upgrade issue. To upgrade an old Ethernet LAN for IP telephony communications, all the legacy Ethernet switches may have to be replaced with new Ethernet switches that are built with the packet prioritization and VLAN capabilities. Such a forklift network upgrade is not only costly but also is likely to cause disruptions to the normal operation of the network before the network becomes stabilized.

4) Network management and maintenance issue. Migrating a legacy Ethernet LAN to a new LAN for IP telephony communications also introduces extra amount of workloads and costs in setting up and managing the new network. The network setup and management become much more complicated and time consuming due to the fact that a lot more items and parameters related to the network behaviors and performances have to be configured and monitored, most of times manually by well trained and experienced IT professionals. The complexities and the need of highly trained IT personnel for setting up and managing an Ethernet LAN for IP telephony communications introduce hidden costs to the ownership of the overall network system.

5) Emergence 911 calls issue. In a traditional PBX system, a telephone is connected to a PBX port/line that is assigned with a fixed telephone number. This unique 1-to-1 mapping between a telephone number and a phone line or PBX port is used to track the physical location of the telephone. However, in an IP telephony system, the phone number of an IP phone is not associated with the port of an Ethernet LAN switch to which the IP phone is connected to. Instead the phone number is assigned based on the MAC (Media Access Control) address of the IP phone itself. MAC address is a physical address for identifying a device connected to a network. In other words, an IP phone can be connected to a different port of the LAN switch but still has the same telephone number. Such mobility nature of IP phones makes it difficult in tacking the location of the IP phone to support emergency E-911 calling in an IP telephony system.

Meanwhile, because of the benefits of the convergence of data and voice communications over an Ethernet LAN, there are demands to resolve these technical and operational limitations that may hinder the broad applications and deployments of IP telephony communications over Ethernet LANs.

SUMMARY OF THE INVENTION

A primary object of the present invention is to provide an appreciable simple and inexpensive solution to resolve the above discussed problems and limitations by selectively transferring data packets associated with two independent switches on shared network cabling.

This and other objects are realized in accordance with various aspects and embodiments of the present invention as summarized as follows.

Accordingly, one aspect of the present invention is to provide a local area network in which Ethernet channels and corresponding out-of-band channels are established on shared network cabling by which a network first switch operating as a data switch receives and forwards data packets over the Ethernet channels among data terminal devices such as computers and a second network switch operating as a voice switch receives and forwards data packets over the out-of-band channels among voice terminal devices such as IP phones.

Another aspect of the present invention is to further provide inline power over respective LAN cables of the network cabling for supplying power to the voice terminal devices such as IP phones.

Another aspect of the present invention is to further implement a network access control and location tracking mechanism for the voice switch by which the voice switch receives and forwards packets from only authorized voice terminal devices and uniquely associates each receiving port of the voice switch with the MAC address of a single authorized voice terminal device such as an IP phone.

In one preferred embodiment, an Ethernet channel is a 10/100Base-T Ethernet link operating over two twisted pairs of a LAN cable and an out-of-band channel is a 10/100Base-T Ethernet link operating over the other two otherwise unused twisted pairs of the LAN cable. Furthermore, a power sourcing equipment is implemented to supply inline power to a voice terminal device such as an IP phone over the two otherwise unused twisted pairs of the LAN cable.

In another preferred embodiment, an Ethernet channel is a 10/100Base-T Ethernet link operating over two twisted pairs of a LAN cable and an out-of-band channel is a 10/100Base-T Ethernet link operating over the other two otherwise unused twisted pairs of the LAN cable. Furthermore, voltage polarity adjusting means is implemented for properly coupling and transmitting externally applied inline power to a voice terminal device such as an IP phone over the two otherwise unused twisted pairs of the LAN cable.

In another preferred embodiment of the present invention, an Ethernet channel is a gigabit Ethernet link compatible with 1000Base-T operating over four twisted pairs of a LAN cable and an out-of-band channel is implemented by transferring out-of-band data during inter-frame periods of the gigabit Ethernet link.

In another preferred embodiment of the present invention, an out-of-band channel is established along with an Ethernet channel compatible with 1000Base-T operating over four twisted pairs of a LAN cable by transferring the out-of-band data by using at least one scrambled bit selected from a set of scrambled bits including bit $Sd_n[2]$ and bit $Sd_n[3]$ during inter-frame periods of the Ethernet channel, where bit $Sd_n[2]$ and bit $Sd_n[3]$ are two bits of the 9-bit scrambled data $Sd_n[8:0]$ associated with the Ethernet channel as specified in IEEE Standard 802.3.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENTS

Figure 1:
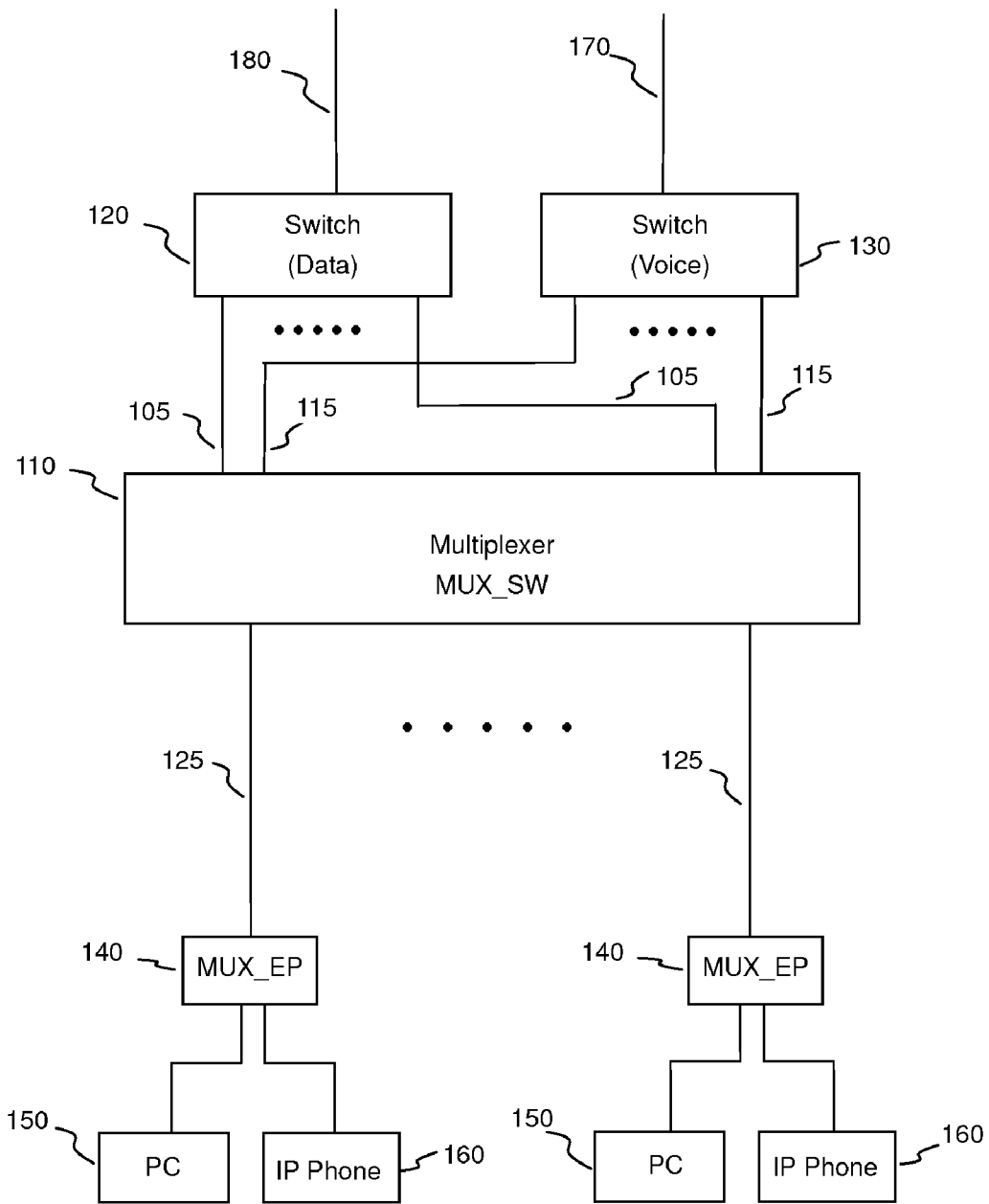
FIG. 1 is a block diagram of a local area network for separately transferring data packets associated with two independent switches for IP telephony communications on shared network cabling according to the present invention.

Referring to FIG. 1 for a functional block diagram of the local area network for selectively transferring data packets associated with two switches on shared network cabling for IP telephony communications according to the present invention. A network multiplexer MUX_SW 110 at the network side and a corresponding remote multiplexing apparatus MUX_EP 140 at each remote terminal location are connected by a LAN cable 125, by which a full-duplex Ethernet channel and a full-duplex out-of-band channel are established over the LAN cable 125. The out-of-band channel provides adequate bandwidth for transmission at least one channel of digitized voice signal; preferably, it provides enough bandwidth for transmission of a channel of compressed digitized video signal for video IP telephony communications. Typically, the data rate of digitized voice signal of telephone voice quality is 64 Kbps; the actual data rate will be higher when it is encapsulated as IP packets. Network multiplexer MUX_SW 110 further connects to a first switch 120 via patch cable 105 and a second switch 130 via patch cable 115 respectively; the corresponding remote multiplexing apparatus MUX_EP 140 further connects via two patch cables to a data terminal device 150 and a voice terminal device 160, respectively. As such, first switch 120 receives and forwards data packets among data terminal devices 150 over the Ethernet channels while second switch 130 receives and forwards data packets among voice terminal devices 160 over the out-of-band channels. Network multiplexer MUX_SW 110 may be implemented with different system configurations as will be further described below.

As can be appreciated by a person with ordinary skill in the art, such network architecture inherently achieves data traffic separation between first switch 120 and second switch 130 that operate independently at the data link layer (layer 2) of the standard network hierarchy.

In one embodiment of the present invention, data terminal device 150 is a computer and voice terminal device 160 is an IP phone. Accordingly, first switch 120 is referred to as data switch and second switch 130 is referred to as voice switch.

In this embodiment, data switch 120 is a standard Ethernet switch. The primary use of data switch 120 is for receiving and forwarding packets originated from computers 150 or other data terminals or hosts. Typically, these computers are used for running "non-QoS critical" network applications, in which real time transmission of packets is not necessary in terms of packet delay, packet jittering and packet loss. For example, email communication is a typical non-QoS critical network application. Data switch 120 can be a legacy unmanaged Layer 2 Ethernet switch, or it can be a more advanced managed Ethernet switch that supports VLAN and QoS, if desired.

Voice switch 130 is a packet-based switching device dedicated to receiving and forwarding packets originated from IP phones 160 or other voice terminals or hosts. Preferably, voice switch 130 is an unmanaged Layer-2 Ethernet switch, but it can be a more advanced managed Ethernet switch that supports VLAN and QoS, if desired. Voice switch 130 is not limited to an Ethernet switch and it can be a switching device of a different packet-based switching technology such as ATM (Asynchronous Transfer Mode).

Furthermore, either data switch 120 or voice switch 130 can be a general network device.

Although data switch 120, voice switch 130 and network multiplexer MUX_SW 110 are shown as separated devices in FIG. 1, these functional units may be integrated together as a single network device.

Preferably, both data switch 120 and voice switch 130 are provided with one or more uplink port for connecting with uplink cable 180 and 170, respectively. An uplink port on data switch 120 connected by cable 180 can be used for connecting to another network device such as a switch, a router, a server and etc; an uplink port on voice switch 130 connected by cable 170 can be used for connecting to another network device such as a switch, a call server of processing IP telephony calling, a PSTN (Public Switching Telephone Network) media gateway and etc.

Figure 2A:
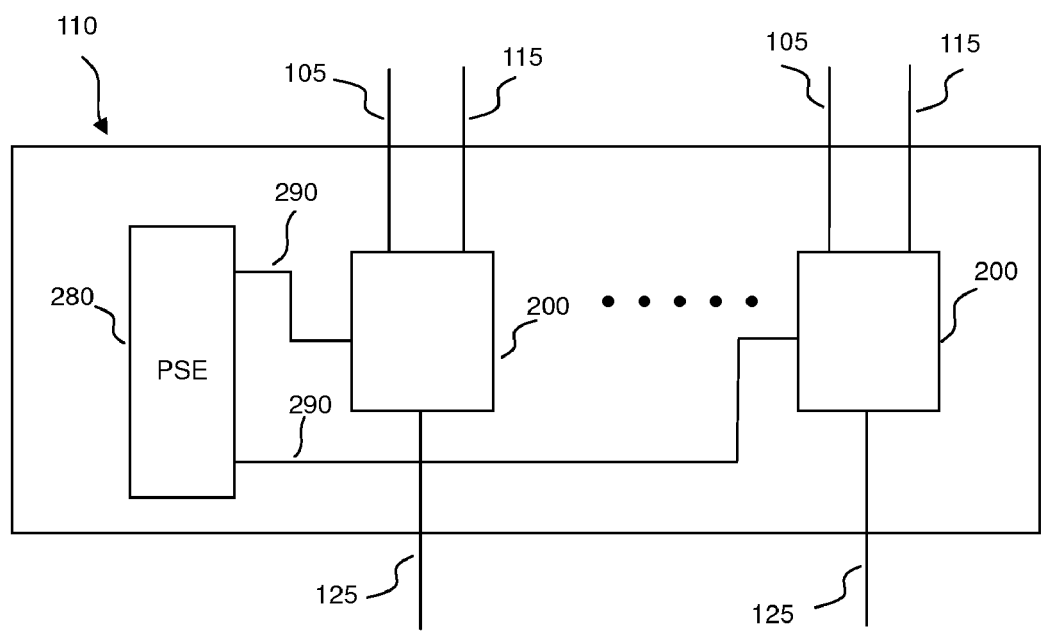
FIG. 2A is a block diagram of a network multiplexer MUX_SW with an integrated power sourcing equipment (PSE) according to a preferred embodiment of present invention.

Referring to FIG. 2A for a block diagram of network multiplexer MUX_SW 110 in FIG. 1 according to a preferred embodiment of the present invention. Network multiplexer MUX_SW 110 includes a Power Sourcing Equipment (PSE) 280 and at least one multiplexing module 200. Functionally, each multiplexing module 200 is used to establish an out-ofband channel operating as a 10/100Base-T Ethernet link over two otherwise unused twisted pairs, pair 4-5 and pair 7-8 of LAN cable 125, for carrying the 10/100Base-T Ethernet data signals carried by patch cable 115 along with the Ethernet channel operating as a 10/100Base-T Ethernet link over two twisted pairs, pair 1-2 and pair 3-6 of LAN cable 125, for carrying the 10/100Base-T signals carried by patch cable 105. Furthermore, inline power 290 provided by PSE 280 is applied between two otherwise unused pair 4-5 and pair 7-8 of LAN cable 125 for supplying power remotely to IP phone 160. The multiplexing module 200 includes three network input/output (I/O) port. A first and a second network I/O ports connect to data switch 120 and voice switch 130 via patch cables 105 and 115, respectively; a third network I/O port of multiplexing module 200 connects over the LAN cable 125 to the corresponding remote multiplexing apparatus MUX_EP 140 that further connects to a data terminal device such as computer 150 and a voice terminal device such as IP phone 160, respectively.

Figure 2B:
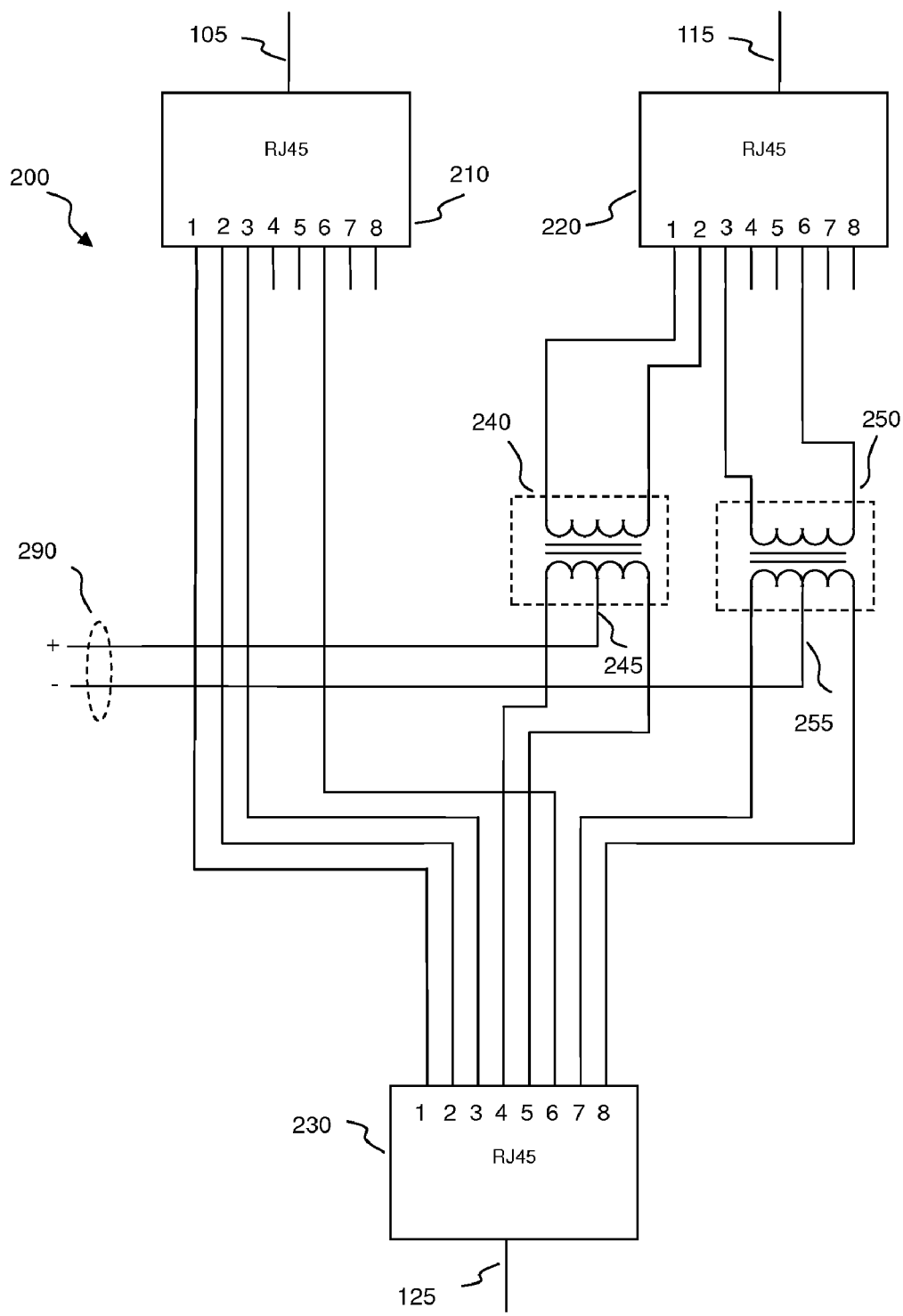
FIG. 2B is a schematic view of the multiplexing module in FIG. 2A.

FIG. 2B is a schematic view of multiplexing module 200 of FIG. 2A. Multiplexing module 200 includes three RJ45 jacks 210, 220 and 230 for connecting to patch cable 105, patch cable 115 and LAN cable 125 accordingly. As is shown in FIG. 2B, pin 1, 2, 3, and 6 of RJ45 jack 210 are wired to pin 1, 2, 3 and 6 of RJ45 jack 230. As such, pair 1-2 and pair 3-6 of patch cable 105 and pair 1-2 and pair 3-6 of LAN cable 125 are electrically connected. The pin 4, 5, 7 and 8 of RJ45 jack 210 may be left open. Pin 1 and 2 of RJ45 jack 220 are wired to one winding side of a first isolation transformer 240, and pin 4 and 5 of RJ45 jack 230 are wired to the other winding side of isolation transformer 240. In a similar way, pin 3 and 6 of RJ45 jack 220 are wired to one winding side of a second isolation transformer 250, and pin 7 and 8 of RJ45 jack 230 are wired to the other winding side of isolation transformer 250. In such a way, the data signals carried by pair 1-2 and pair 3-6 of patch cable 115 is AC coupled with pair 4-5 and pair 7-8 of LAN cable 125. On the other hand, the two output ends of inline power output 290 from PSE 280 are wired to the center tap 245 of the first isolation transformer 240 and center tap 255 of the second isolation transformer 250 respectively to apply the inline power voltage as a common mode voltage between pair 4-5 and pair 7-8 of LAN cable 125. As a result, pair 4-5 and pair 7-8 of LAN cable 125 carry both data signals of patch cable 115 and the inline power 290 provided by PSE 280.

Figure 3A:
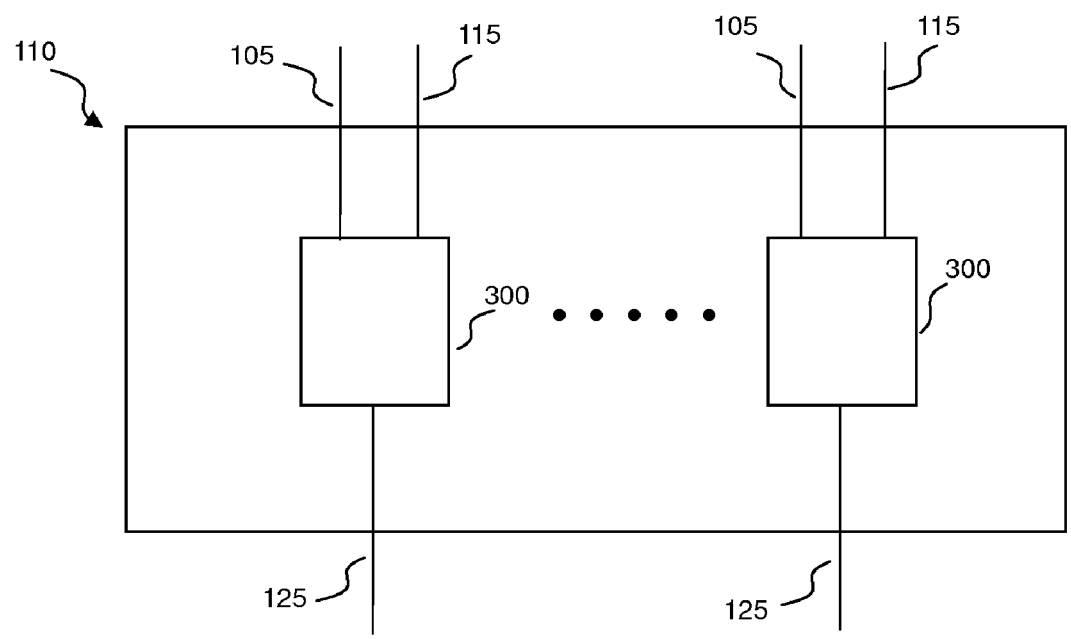
FIG. 3A is a block diagram of a network multiplexer MUX_SW without an PSE according to a preferred embodiment of present invention.

Referring to FIG. 3A for a block diagram of network multiplexer MUX_SW 110 of FIG. 1 according to another preferred embodiment of the present invention, in which inline power is applied externally. It includes at least one multiplexing modules 300. Multiplexing module 300 operates similarly to multiplexing module 200 except for that it receives inline power carried by patch cable 115, which is then coupled and applied to LAN cable 125. Inline power carried by patch cable 115 may be provided by an external PSE operating either as a mid-span PSE or an endpoint PSE.

Figure 3B:
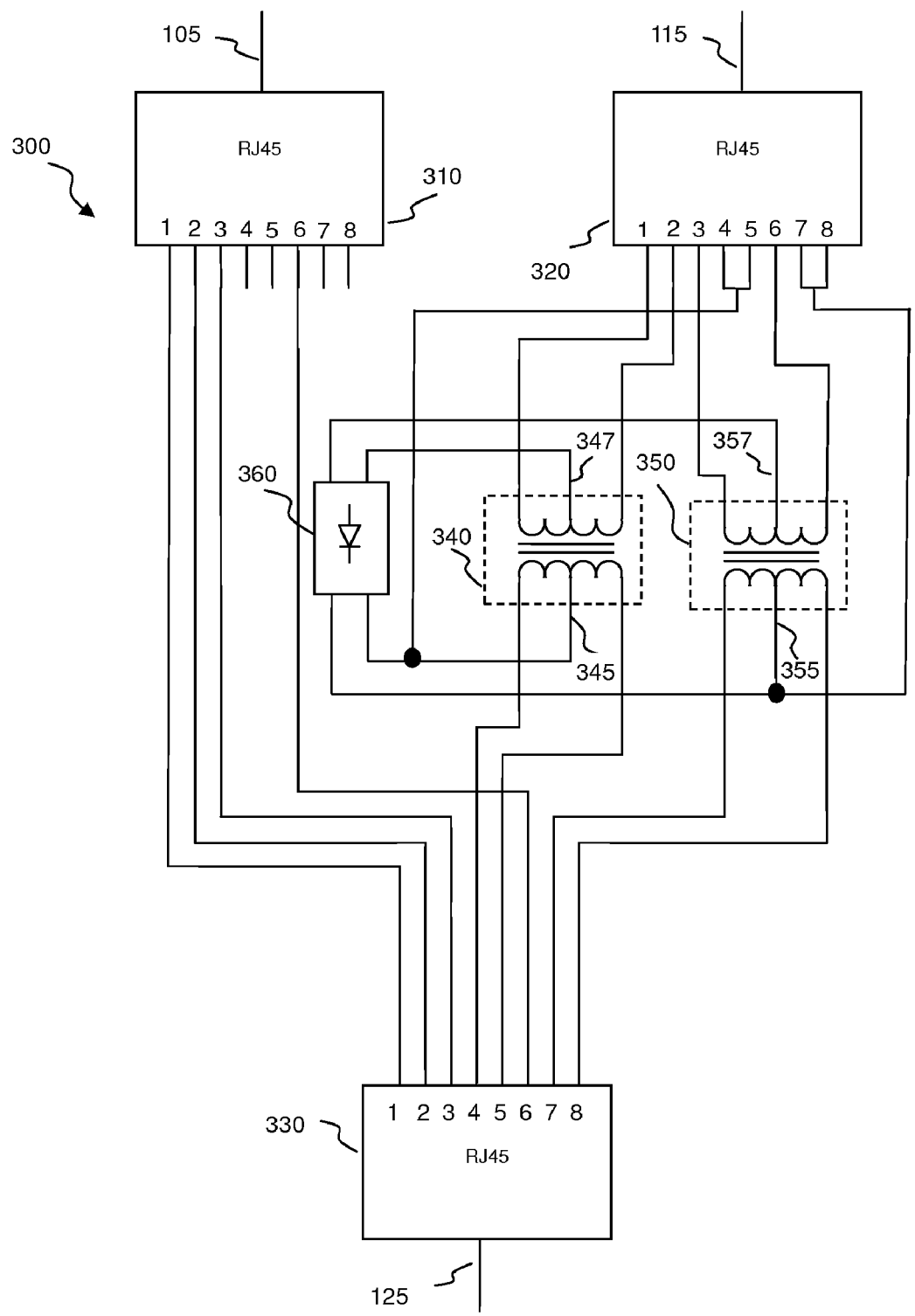
FIG. 3B is a schematic view of the multiplexing module in FIG. 3A.

FIG. 3B is a schematic view of multiplexing module 300 of FIG. 3A. Center tap 345 of a first isolation transformer 340 connects to pre-connected pin 4 and pin 5 of RJ45 jack 320 and center tap 355 of a second isolation transformer 350 connects to pre-connected pin 7 and pin 8 of RJ45 jack 320. As such the "Alternative B" inline power as defined by IEEE Standard 802.3af which is carried by pair 4-5 and pair 7-8 of patch cable 115 is applied as a common mode voltage between pair 4-5 and pair 7-8 of LAN cable 125 through RJ45 jack 330.

Furthermore, a voltage polarity adjusting circuit 360 is implemented in which center tap 347 of the first isolation transformer 340 and center tap 357 of the second isolation transformer 350 are connected respectively with two input ends of voltage polarity adjusting circuit 360 and the two output ends of voltage polarity adjusting circuit 360 are connected to center tap 345 of transformer 340 and center tap 355 of transformer 350 respectively. Voltage polarity adjusting circuit 360 essentially includes diodes and it ensures that inline power of "Alternative A" that may be carried by pair 1-2 and pair 3-6 of patch cable 115 is applied properly between pair 4-5 and pair 7-8 of LAN cable 125 with correct voltage polarity as defined by IEEE Standard 802.3af, regardless whether or not patch cable 115 is a straight-through cable or a cross-over cable, which would cause opposite input voltage polarity; also, when both "Alternative A" and "Alternative B" inline power are carried by patch cable 115, voltage polarity adjusting circuit 360 ensures that "Alternative A" inline power and "Alternative B" inline power carried by patch cable 115 are connected or "merged" with correct voltage polarities.

Even though RJ45 jack are used in describing the embodiments of the present invention as illustrated in FIG. 2A, FIG. 2B, FIG. 3A and FIG. 3B, other types of connectors may also be used when appropriate. For example, an 8-contact Insulation Displacement Contact (IDC) connector can be used to replace RJ45 jack 230 in FIG. 2B and RJ45 jack 330 in FIG. 3B. Particularly, IDC connectors may be used when MUX_SW 110 is implemented as a patch panel.

Figure 4:
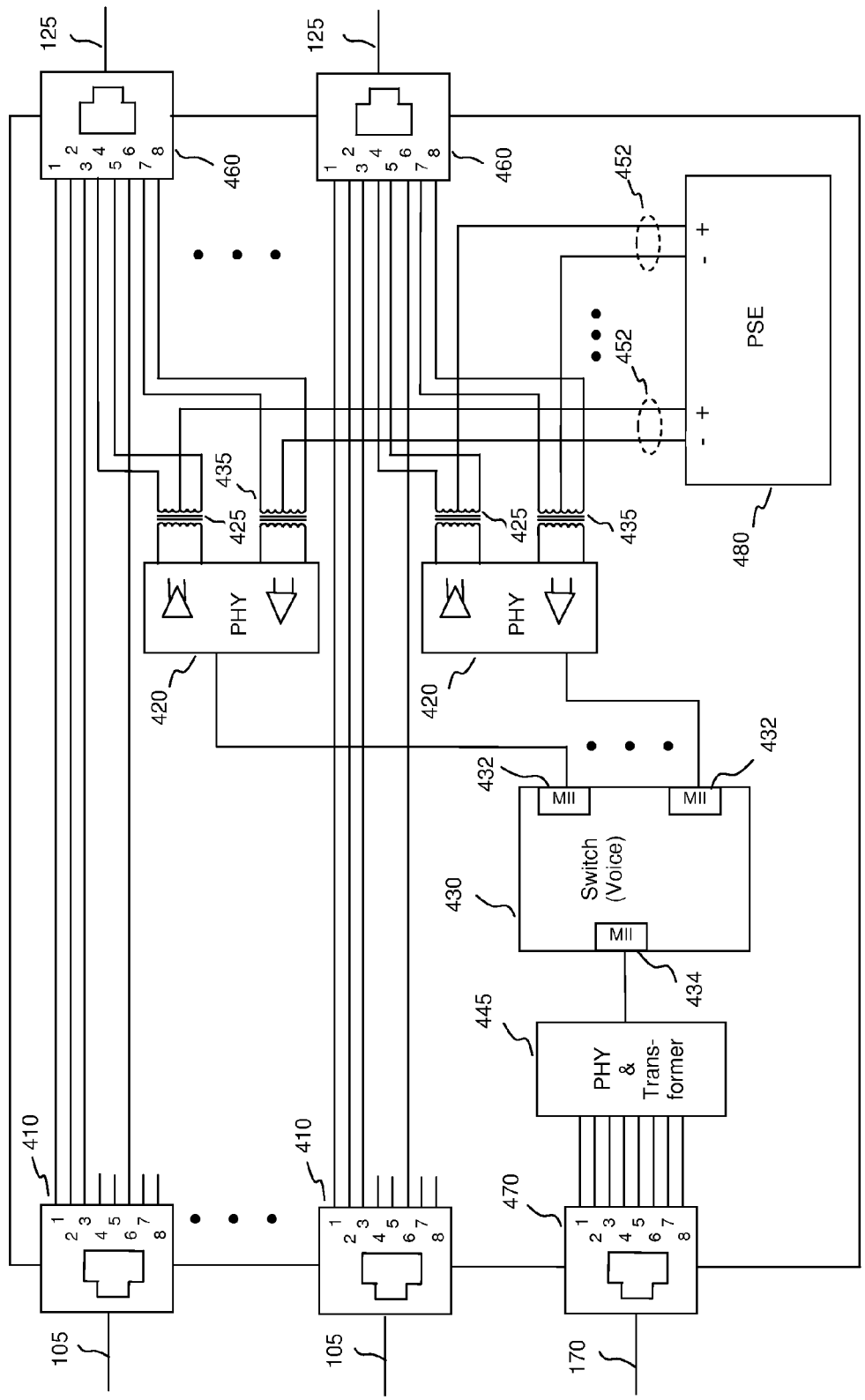
FIG. 4 is a schematic view of a preferred embodiment in which an Ethernet switch operating as a voice switch is integrated with network multiplexer MUX_SW 110 including a power sourcing equipment in FIG. 2A for operating advantageously as a single network device.

Referring to FIG. 4 for a schematic view of another preferred embodiment of the present invention in which an Ethernet switching unit 430 functioning as voice switch 130 is further integrated with network multiplexer MUX_SW 110 of FIG. 2A for operating advantageously as a single network device. The power sourcing equipment in FIG. 2A is represented as a PSE 480 in FIG. 4. Each RJ-45 jack 410 is for connecting to a port on an external Ethernet switch functioning as data switch 120 over patch cable 105, and each RJ-45 jack 460 is for connecting to corresponding remote multiplexing apparatus MUX_EP 140 over LAN cable 125. Accordingly, pin 1, 2, 3 and 6 of both RJ45 jack 410 and 460 are wired together with each other. As such, pair 1-2 and pair 3-6 of patch cable 105 and pair 1-2 and pair 3-6 of LAN cable 125 are connected. The internal Ethernet switching unit 430 is provided with multiple I/O ports 432, each operating as a Media Independent Interface (MII), which is a standard interface between a data link layer device and a physical layer device as defined in the IEEE Standard 802.3 for a 10/100Base-T Ethernet link. Each MII port 432 of Ethernet switching unit 430 connects with an Ethernet physical layer device (PHY) 420. The two transmit output ends of PHY 420 are connected with two ends of the PHY side winding of a first isolation transformer 425 and the two ends of the cable-side winding of transformer 425 are connected to pin 4 and 5 of RJ45 jack 460. As such, transmit output from PHY 420 is differentially AC-coupled onto pair 4-5 of LAN cable 125. The two receive input ends of PHY 420 are connected with two ends of the PHY side winding of a second isolation transformer 435 and the two ends of the cable-side winding of transformer 435 are connected to pin 7 and 8 of RJ45 jack 460. As such, receive input of PHY 420 is differentially AC-coupled from pair 7-8 of LAN cable 125. Furthermore, the two output ends of inline power output port 452 from PSE 480 are wired to the center tap of transformer 435 and the center tap of transformer 425 respectively as shown in FIG. 4 so that the inline power is applied between pair 4-5 and pair 7-8 as a common mode voltage. As such, pair 4-5 and pair 7-8 of LAN cable 125 carry both the transmit and receive data signals of PHY 420 as well as the inline power from the PSE 480.

Ethernet switching unit 430 may be provided with at least one MII port 434 which is interfaced with a PHY device 445 that is further wired with RJ45 jack 470 via an isolation transformer (still represented by the block 445). This network port is used as an uplink port for connecting with uplink cable 170. It should be noted that such an uplink port is not limited to be a 10/100Base-T Ethernet port, it also can be a Gigabit Ethernet port.

Although RJ45 jacks are used in describing the embodiments of the present invention as illustrated in FIG. 4, other types of connectors may also be used when appropriate. For example, an 8-contact Insulation Displacement Contact (IDC) connector can be used to replace RJ45 jack 460 when the apparatus shown in FIG. 4 is implemented as a patch panel.

Figure 5:
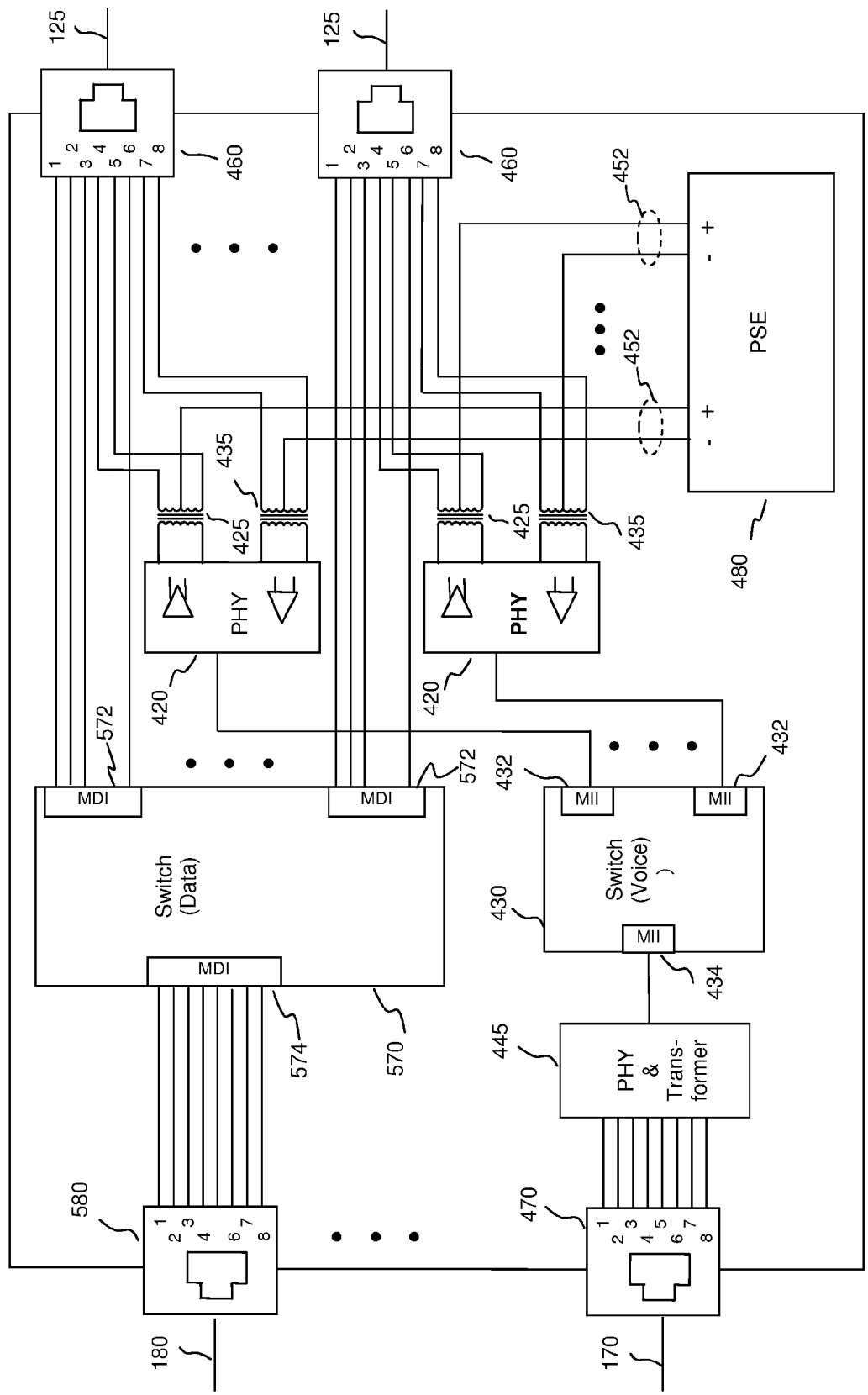
FIG. 5 is a schematic view of a preferred embodiment of the present invention in which two independent Ethernet switches operating as a data switch and a voice switch respectively are further integrated with network multiplexer MUX_SW 110 including a power sourcing equipment in FIG. 2A for operating advantageously as a single network device.

Referring to FIG. 5 for a schematic view of another preferred embodiment of the present invention in which a second Ethernet switching unit 570 functioning as data switch 120 is further integrated with the apparatus as shown in FIG. 4 for operating advantageously as a single network device.

As shown in FIG. 5, Ethernet switching unit 570 is provided with multiple ports 572 and at least one uplink port 574, each operating as a Media Dependant Interface (MDI) as defined in the IEEE Standard 802.3. A MDI port operating in the 10/100Base-T Ethernet mode is a four-pin interface consisting of a transmit pin pair and receive pin pair for connecting with two twisted pairs directly. The MDI ports are illustrated just for the benefit of simplifying the drawing of FIG. 5 by not showing the PHY devices and their associated isolation transformers.

As is shown in FIG. 5, pin 1, 2, 3 and 6 of RJ45 jack 460 are wired with corresponding pins of MDI port 572 of Ethernet switching unit 570. As such, computer 150 communicates with Ethernet switching unit 570 over pair 1-2 and pair 3-6 of LAN cable 125. Similarly to what is illustrated in FIG. 4, Ethernet switching unit 570 may be provided with at least one uplink port 574 accessible via RJ45 jack 580 for connecting with uplink cable 180.

In the preferred embodiments as illustrated in FIG. 2 through FIG. 5, a corresponding 3-port multiplexing apparatus MUX_EP 140 is used at each remote location. Multiplexing apparatus MUX_EP 140 is provided with one network I/O port for connecting to network multiplexer MUX_SW 110 over LAN cable 125 and another two network I/O ports for connecting via two patch cables to computer 150 and the IP phone 160, respectively. Such a 3-port multiplexing apparatus is commercially available, which is sometime referred to as RJ45 splitter or Ethernet splitter.

Figure 6:
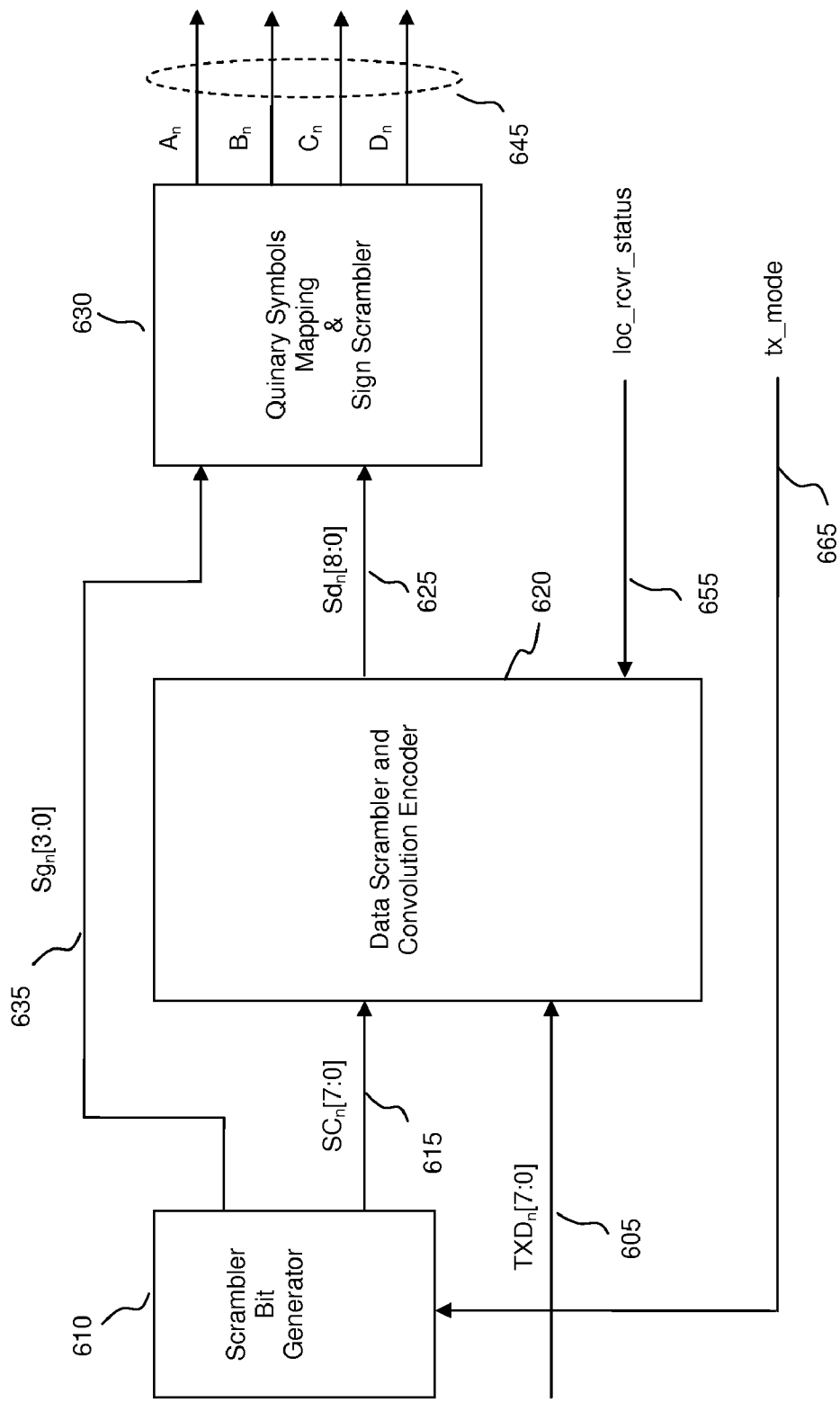
FIG. 6 is a simplified block diagram of the 1000BASE-T Physical Coding Sub-layer (PCS) transmitter.
Figure 7:
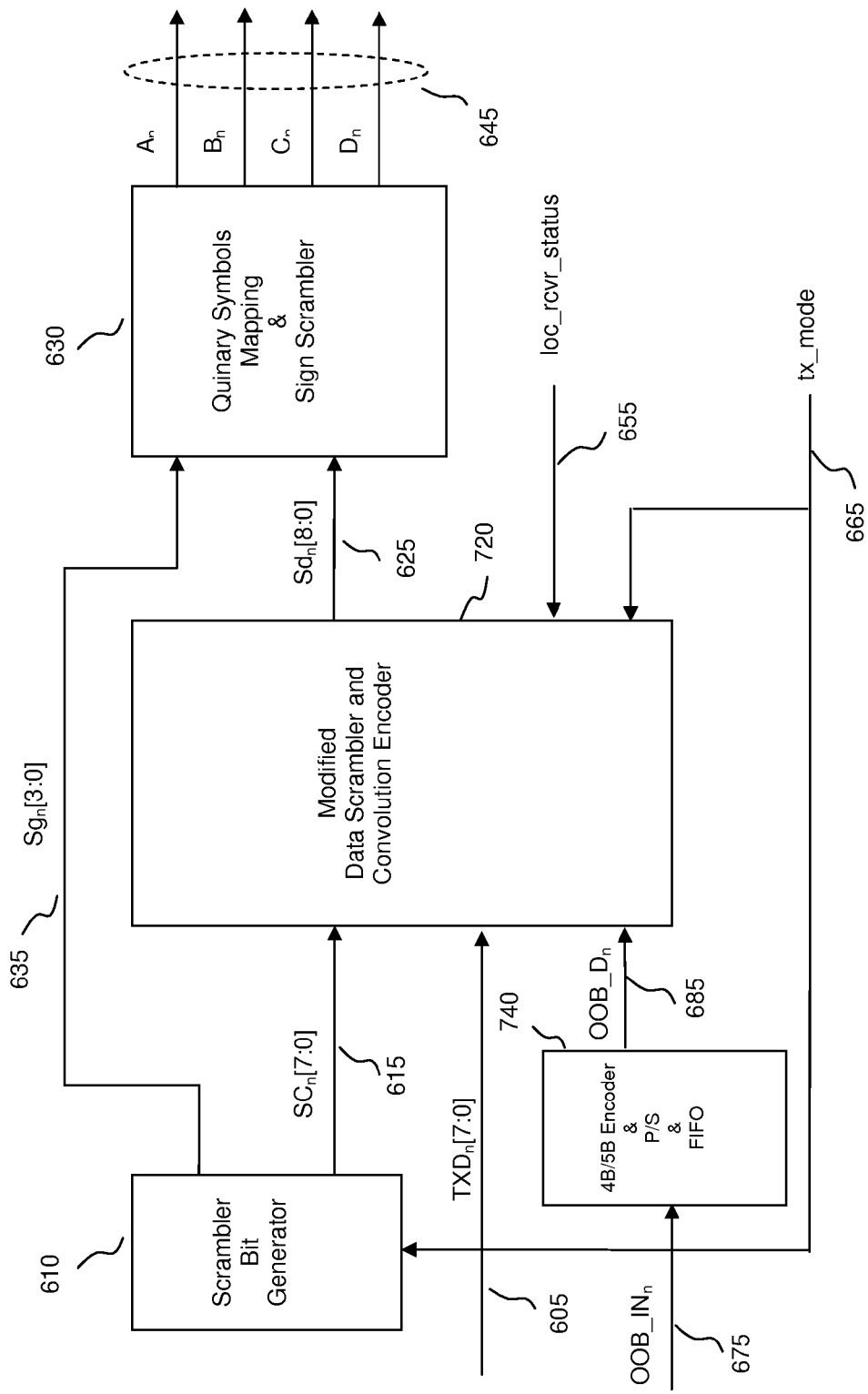
FIG. 7 is a block diagram for transferring out-of-band data via the scrambled bit $Sd_n[2]$ and/or bit $Sd_n[3]$ according to a preferred embodiment of the present invention.

FIG. 6 and FIG. 7 describes methods and embodiments according to the present invention for transferring out-of-band data along with a gigabit Ethernet channel operating as a 1000Base-T Ethernet link using all the four twisted pairs of LAN cable 125, which can be utilized for implementing the multiplexing module(s) of network multiplexer MUX_SW 110 as well as remote multiplexing apparatus MUX_EP 140 for establishing an out-of-band channel along with the Ethernet channel compatible with 1000Base-T over all the four twisted pairs of LAN cable 125.

Referring FIG. 6 for a simplified block diagram showing the transmitter of 1000Base-T physical coding sublayer (PCS) as specified in IEEE Standard 802.3. Each 8-bit transmit data of the Gigabit Media Independent Interface (GMII), $TXD_n[7:0]$ 605, is scrambled by a Data Scrambler and Convolution Encoder 620 with an 8-bit random number, $SC_n[7:0]$ 615, which is generated by a Scrambler Bit Generator 610. The output from the Data Scrambler and Convolution Encoder 620 is a 9-bit data, represented as $Sd_n[8:0]$ 625. The 9-bit data $Sd_n[8:0]$ 625 is then mapped to a quartet of quinary symbols $(TA_n, TB_n, TC_n, TD_n)$ (not shown) inside a Quinary Symbols Mapping & Sign Scrambler 630 according to Table 40-1 and Table 40-2 of IEEE Standard 802.3. The signs of the quinary symbols $(TA_n, TB_n, TC_n, TD_n)$ are further randomized by a 4-bit random data $Sg_n[3:0]$ 635 to remove the DC bias from the sequence of quinary symbols $(TA_n, TB_n, TC_n, TD_n)$, which is then output as a sequence of quinary symbols, represented as $(A_n, B_n, C_n, D_n)$ 645.

According to IEEE Standard 802.3, a "loc_rcvr_status" signal 655 is also transmitted to the receiver carried by bit $Sd_n[2]$, which has two-values including "OK" and "NOT OK" to indicate the receive status of a local physical layer device. At the receiver, this signal is received from the descrambled bit stream of bit $Sd_n[2]$ as a "rem_rcvr_status" signal (not shown), which also has two values including "OK" and "NOT_OK" to indicate the receive status of the corresponding remote physical layer device.

According to IEEE Standard 802.3, a tx_mode signal 665 is generated by the Physical Medium Attachment (PMA) sublayer and is involved in generating certain bits of 8-bit random number $SC_n[7:0]$ 615 by Scrambler Bit Generator 610. tx_mode signal 665 has three values including SEND_N, SEDN_I and SEND_Z.

When tx_mode=SEND_N, the PCS transmitter operates in normal mode in which the PCS transmits data, control or idle symbols (a special signaling); when tx_mode=SEND_I, the PCS transmitter operates in training mode in which the PCS transmitter is directed to transmit only idle symbols, which enable the receiver at the other end to train until it is ready to operate in normal mode.

Among 9 bits of the scrambled data $Sd_n[8:0]$, bit $Sd_n[2]$ and bit $Sd_n[3]$ are generated respectively according to the following equations (1) and (2) as defined in IEEE Standard 802.3:

$$Sd_n[2] = \begin{cases} Sc_n[2] \wedge TXD_n[2] & \text{if } (tx\_enable_{n-2} = 1) \\ Sc_n[2] \wedge 1 & \text{else if } (loc\_rcvr\_status = OK) \\ Sc_n[2] & \text{else} \end{cases} \quad (1)$$

$$Sd_n[3] = \begin{cases} Sc_n[3] \wedge TXD_n[3] & \text{if } (tx\_enable_{n-2} = 1) \\ Sc_n[3] & \text{else} \end{cases} \quad (2)$$

where "^" represents "EXCLUSIVE OR" logic operator; integer "n" is a time index; $(tx\_enable_{n-2}=1)$ represents a time period when $TXD_n$ data is being transmitted; otherwise, it represents a time period with no $TXD_n$ data activity. In the normal mode, a time period with no $TXD_n$ data activity is also referred to as an inter-frame period. Sometimes it is referred to as inter-frame or inter-packet gap.

The above is a brief description of how the 1000Base-T PCS works, more detailed description can be found in Chapter 40 of IEEE Standard 802.3, "Physical Coding Sublayer (PCS), Physical Medium Attachment (PMA) sublayer and baseband medium, type 1000BASE-T".

As can be seen from equation (1) and (2), during an inter-frame period, bit $Sd_n[3]$ may change their values without carrying any additional data information; bit $Sd_n[2]$ may change their values without carrying any additional data information except for the 'loc_rcvr_status" which is always "OK" during the inter-frame period while tx_mode=SEND_N.

On the other hand, according to the Table 40-1 of IEEE Standard 802.3, the most significant 5 bits $Sd_n[8:4]$ are kept as "00000" during an inter-frame period and bits $Sd_n[3:0]$ varies, each of which corresponds to an idle symbol during an inter-frame period. In other words, altering any of bit $Sd_n[2]$ and bit $Sd_n[3]$ during an inter-frame period would not result a non-idle symbol to be generated, and thus would not affect the PCS encoding rules as defined in IEEE Standard 802.3 for maintaining the integrity of a 1000Base-T Ethernet link.

Therefore, according to the present invention, bit $Sd_n[2]$ or bit $Sd_n[3]$ or both of these two bits are utilized for transferring additional information, or out-of-band data, during inter-frame periods of an Ethernet channel operating as a 1000Base-T gigabit Ethernet link while the integrity of the 1000Base-T Ethernet link is fully maintained.

More specifically, according to the present invention, the following two equations (3) and (4) are devised for transferring out-of-band data via bit $Sd_n[2]$ and bit $Sd_n[3]$ respectively during inter-frame periods:

$$Sd_n[2] = \begin{cases} Sc_n[2] \wedge TXD_n[2] & \text{if } (tx\_enable_{n-2} = 1) \\ Sc_n[2] \wedge OOB\_D_n & \text{else if } (tx\_mode = SEND\_N) \\ Sc_n[2] \wedge 1 & \text{else if } (loc\_rcvr\_status = OK) \\ Sc_n[2] & \text{else} \end{cases} \quad (3)$$

$$Sd_n[3] = \begin{cases} Sc_n[3] \wedge TXD_n[3] & \text{if } (tx\_enable_{n-2} = 1) \\ Sc_n[3] \wedge (! OOB\_D_n) & \text{else if } (tx\_mode = SEND\_N) \\ Sc_n[3] & \text{else} \end{cases} \quad (4)$$

where "!" represents "NOT" logic operator; $OOB\_D_n$ represents a 1-bit out-of-band data at time n that is encoded by a encoding method suitable for transmitting and receiving the out-of-band data. Furthermore, the 1-bit data $OOB\_D_n$ associated with bit $Sd_n[2]$ is encoded in such a way that the information "loc_rcvr_status=OK" is encoded in the bit stream of $OOB\_D_n$ being transmitted during inter-frame periods and can be fully decoded and reconstructed at the receiver.

In a preferred embodiment of the present invention, a 4B/5B encoding method represented by Table 1 is adopted to encode the raw out-of-band data for transmission via bit $Sd_n[2]$. As shown in Table 1, each 4-bit raw out-of-band data is encoded as one of the sixteen 5-bit DATA code-groups. An IDLE code-group of "11111" is transmitted when no out-of-band data is available for transmission. Another two code-groups J and K are always grouped as a code-group pair "1100010001" and are transmitted regularly for establishing code-group boundaries to facilitate the decoding process at the receiver.

TABLE 1

4B/5B Code-Groups for Encoding
Out-of-Band Data in Normal Mode

| Name | Description | 5B Code-Group | 4B Code | Loc_rcvr_status |
|------|-------------|---------------|---------|-----------------|
| 0 | Data #0 | 11110 | 0000 | OK |
| 1 | Data #1 | 01001 | 0001 | OK |
| 2 | Data #2 | 10100 | 0010 | OK |
| 3 | Data #3 | 10101 | 0011 | OK |
| 4 | Data #4 | 01010 | 0100 | OK |
| 5 | Data #5 | 01011 | 0101 | OK |
| 6 | Data #6 | 01110 | 0110 | OK |

TABLE 1-continued

4B/5B Code-Groups for Encoding
Out-of-Band Data in Normal Mode

| Name | Description | 5B Code-Group | 4B Code | Loc_rcvr_status |
|------|-------------|---------------|---------|-----------------|
| 7 | Data #7 | 01111 | 0111 | OK |
| 8 | Data #8 | 10010 | 1000 | OK |
| 9 | Data #9 | 10011 | 1001 | OK |
| A | Data #A | 10110 | 1010 | OK |
| B | Data #B | 10111 | 1011 | OK |
| C | Data #C | 11010 | 1100 | OK |
| D | Data #D | 11011 | 1101 | OK |
| E | Data #E | 11100 | 1110 | OK |
| F | Data #F | 11101 | 1111 | OK |
| I | IDLE | 11111 | Undefined | OK |
| J | SSD#1 | 11000 | Undefined | OK |
| K | SSD#2 | 10001 | Undefined | OK |
| V | Invalid | Others | Undefined | NOT OK |

As can be appreciated by a person skilled in the art, the encoding method represented by Table 1 ensures that there are no more than 3 consecutive zeros in an encoded bit stream of the out-of-band data. Based on this encoding rule, the receiver can retrieve the "loc_rcvr_status" signal from the encoded bit stream of out-of-band data which is further carried by the scrambled bit stream of bit $Sd_n[2]$. In other words, as long as the receiver does not detect a bit pattern of more than 3 consecutive 0's in the encoded bit stream of out-of-band data, it will decode "rem_rcvr_status" signal as be OK; otherwise, it will decode the "rem_rcvr_status" signal as NOT OK.

The 4B/5B encoding method represented by Table 1 can also be adopted for transferring out-of-band data via bit $Sd_n[3]$ except that the requirement of carrying "loc_rcvr_status=OK" in the encoded out-of-band bit stream is not applicable.

As can be appreciated by a person skilled in the art, when no out-of-band data is being transmitted, idle code-groups are being transmitted, therefore, equation (3) and equation (4) are reduced to or equivalent to equation (1) and equation (2), respectively. This means that a physical layer device that operates in accordance with equation (3) and/or equation (4) will operate compatibly with a standard 1000Base-T physical layer device when it is not used for transferring out-of-band data.

Referring to FIG. 7 for a block diagram of transferring out-of-band data via scrambled bit $Sd_n[2]$. A module 740 includes a 4B/5B encoder, a parallel-to-serial converter and a FIFO (first-in-first-out) memory. The original out-of-band data input OOB_IN_675, represented as a 4-bit data, is applied to the 4B/5B encoder, and is encoded and output as a 5-bit data; the 5-bit output data from the 4B/5B encoder is then parallel/serial converted to a sequence of 1-bit data and is then temporally stored in the FIFO. When an inter-frame period arrives, 1-bit out-of-band data stored in the FIFO is read sequentially and is applied as an input bit, represented as $OOB\_D_n$ 685, to a modified Data Scrambler and Convolution Encoder 720. Modified Data Scrambler and Convolution Encoder 720 also receives $TXD_n[7:0]$ 605, $SC_n[7:0]$ 615, "loc_rcvr_status" signal 655 and "tx_mode" signal 665, and operates in accordance with equation (3) to generate bit $Sd_n[2]$ for transferring out-of-band data $OOB\_D_n$ 685 via bit $Sd_n[2]$, while the other 8 bits of $Sd_n[8:0]$ are generated as originally defined by IEEE Standard 802.3.

Similarly, FIG. 7 can be adapted for transferring out-of-band data via bit $Sd_n[3]$ in which modified Data Scrambler and Convolution Encoder 720 operates in accordance with equation (4) to generate bit $Sd_n[3]$, while all the other 8 bits of $Sd_n[8:0]$ are generated as originally defined by IEEE Standard 802.3. In this embodiment, "loc_rcvr_status" signal 655 is disregarded.

Furthermore, as can be appreciated by a person skilled in the art, both bit $Sd_n[2]$ and bit $Sd_n[3]$ can be used simultaneously for transferring out-of-band data for achieving higher data rate.

Other mB/nB encoding method such as 8B/10B may also be used for encoding out-of-band data, where m, and n are two positive integers with m<n.

Although FIG. 7 only depicts primarily the transmitting operation of the PCS functions, it should be appreciated by a person skilled in the art that the corresponding PCS receiver performs the reverse operation to that of the PCS transmitter.

As can be understood, the maximum data rate available for the out-of-band channel as represented by Equation (3) and (4) is simply the symbol rate of 1000Base-T Ethernet, which is 125 Mbps according to IEEE Standard 802.3, weighted by the coding efficiency of the encoding method employed. As an example, for a 4B/5B encoded bit stream of out-of-band data, which has a coding efficiency of 4/5 or 0.8, the maximum data rate is 125 Mb/s×4/5=100 Mb/s.

The minimum data rate of the out-of-band channel occurs when Ethernet packets of maximum packet length are being transmitted continuously with the minimum inter-frame period between two adjacent frames. According to IEEE Standard 802.3, the minimum inter-frame period is of 12 bytes, and maximum packet length is 1530 bytes that include 7 bytes of preambles, 1 byte of SSD (Start of Stream Delimiter) and 4 bytes of VLAN header. Therefore, the minimum frame rate is calculated as:

Frame Rate (min)=1,000,000,000/((1530+12)×8)
=81064 (frames/second)

Thus, the minimum date rate is:

Date Rate (min)=81064×12×4/5=778 (Kbps)

Again, the above minimum data rate is calculated under the assumption that the out-of-band data is 4B/5B encoded with a coding efficiency of 4/5, or 0.8.

As can be appreciated by a person skilled in the art, according to the embodiments of the present invention, a date rate of up to 200 Mbps for transferring out-of-band data can be achieved from a 1000 Base-T gigabit Ethernet link, which would be otherwise unused.

As can be further appreciated by a person skilled in the art, even the minimum data rate available to the out-of-band channel established over an 1000BASE-T gigabit Ethernet link according to the present invention is fast enough for transmission of at least one packetized IP telephony signal, which usually requires a transmission date rate of less than 100 Kbps.

Figure 8:
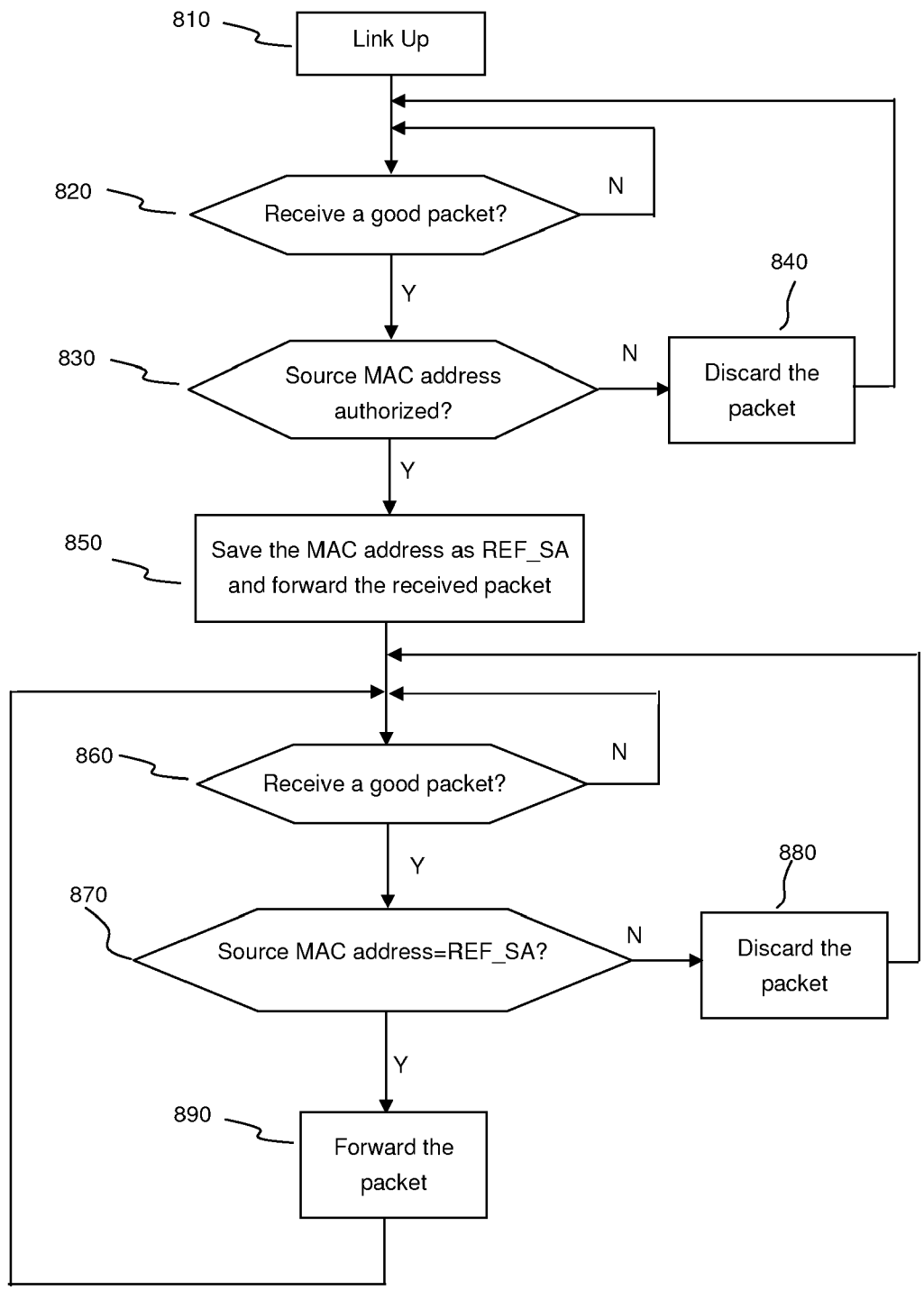
FIG. 8 is a flow diagram for controlling network access and for tracking the location of a voice terminal device such as an IP phone.

Referring to FIG. 8 for a flow diagram of a process for network access control and for tracking locations of IP phones 160 according to a preferred embodiment of the present invention. The process is described as follows:

Step 810: Go to Step 820 when an out-of-band channel is activated between IP phone 160 and a corresponding network I/O port of voice switch 130.

Step 820: The network I/O port of voice switch 130 waits for receiving the first good packet from IP phone 160. A good received packet refers to a received Ethernet packet without any bit errors transmitted from IP phone 160; if a good received packet is received, go to Step 830; otherwise, stay at Step 820.

Step 830: Check the source MAC address of the first received good packet to see if or not it is an authorized MAC address. The inspection of the source MAC address of the received packet is done by comparing it with a pool of authorized source MAC addresses, each of which is assigned to an authorized IP phone and is considered as a type of physical identification for uniquely identifying the IP phone. This pool can be stored as a database locally in voice switch 130, or it can be located in a server that can be accessed by voice switch 130 remotely.

If the source MAC address of the first received good packet from IP phone 160 is an authorized MAC address, go to Step 850; otherwise go to Step 840.

Step 840: Drop the received packet; then go back to Step 820.

Step 850: Forward the received packet to one or multiple network I/O ports accordingly by voice switch 130 based on the destination MAC address of the received packet; and the source MAC address of the received packet is stored as a reference MAC address (REF_SA) associated with this network port; go to Step 860.

Step 860: Wait for receiving a new good packet. If a new good packet is received, go to Step 870; otherwise, stay at Step 860.

Step 870: Check if or not the newly received good packet following the first received good packet is from the same authorized IP phone 160 that sent the first good packet. This is done by comparing the source MAC address of the newly received packet with the stored reference MAC address REF_MAC. If it is, go to Step 890; otherwise, go to Step 880;

Step 880: Drop the received good packet; go to Step 860.

Step 890: Forward the newly received good packet accordingly based on the destination MAC address of the received packet and then go to Step 860.

As such, the network I/O port of voice switch 130 receives and forwards packets from only one authorized IP phone 160, and therefore the port number of the network port of voice switch 130 is uniquely associated with the MAC address of one single authorized IP phone 160, which can be utilized in tracking the location of the IP phone 160.

Another preferred embodiment of the present invention of device access control implements a MAC address-based DHCP (Dynamic Host Configuration Protocol) server. A DHCP server is usually used to assign an IP address to a terminal device that is newly connected to a network, which simplifies network administration because the assignment and management of IP addresses are done automatically by software. According to the embodiment of the present invention, the MAC address-based DHCH server is linked to voice switch 130 and maintains a database of MAC addresses of all the authorized IP phones 160; when IP phone 160 is initially connected to voice switch 130, it sends a packet for requesting an IP address to the MAC address-based DHCP server. The MAC address-based DHCP server receives the IP address request packet, and assigns an IP address from its authorized MAC address database to the newly connected IP phone by replying a packet with assigned IP address only if the source MAC address of the newly connected IP phone is found to be an authorized MAC address. In such a way, any unauthorized terminal device would not be able to be assigned an IP address to start communicating its packets with voice switch 130. Such an embodiment of the present invention is applicable when an IP phone or terminal device is configured to receive an IP address from a DHCP server, and it is not applicable to a device whose IP address is manually and statically assigned. However, such an embodiment of the present invention provides a simple and effective solution to prevent an unauthorized device such as computer 150 from mistakenly connecting to voice switch 130.

Although the present invention has been described in terms of the presently preferred embodiments, it is to be understood that such disclosure is not to be interpreted as limiting. Various alternations and modifications will no doubt become apparent to those skilled in the art after reading the above disclosure.

Furthermore, although the present invention has been described in terms of its application to IP telephony communications over a local area network, it should be noted that the scope of present invention is not limited to this specific application. For example, in a two-switch based local area network of the present invention, the second switch operating over the out-of-band channels on shared network cabling can be used for implementing the control plane for the primary local area network.

Accordingly, it is intended that the appended claims be interpreted as covering all alternations and modifications as fall within the true spirit and scope of the invention.

I claim:

1. An Ethernet switch, comprising:
   an Ethernet switching unit; and
   a plurality of port pairs, each of the port pairs comprising a first 8-pin RJ45 jack and a second 8-pin RJ45 jack, four selected pins of the first RJ45 jack being coupled with the Ethernet switching unit for conducting a 10/100Base-T Ethernet signal associated with the Ethernet switching unit, and the other four pins of the first RJ45 jack being coupled with the second RJ45 jack for conducting a 10/100Base-T Ethernet signal associated the second RJ45 jack, and the second RJ45 jack being electrically disconnected from the Ethernet switching unit, whereby the 10/100Base-T Ethernet signal associated with the Ethernet switching unit and the 10/100Base-T Ethernet signal associated with the second RJ45 jack are delivered on a shared LAN cable connected to the first RJ45 jack.

2. The Ethernet switch of claim 1, further comprising a power sourcing equipment (PSE) for providing inline power over the LAN cable.

3. An Ethernet packet switching apparatus having a housing enclosure, comprising:
   a first Ethernet switching unit;
   a second Ethernet switching unit, the second Ethernet switching unit being separated from the first Ethernet switching unit without an internal intercommunication link between the first and second Ethernet switching units; and
   a plurality RJ45 jacks, pins 1, 2, 3, and 6 of each RJ45 jack being coupled with the first Ethernet switching unit for conducting a 10/100Base-T Ethernet signal associated with the first Ethernet switching unit, and pins 4, 5, 7 and 8 of the RJ45 jack being coupled with the second Ethernet switching unit for conducting a 10/100Base-T Ethernet signal associated with the second Ethernet switching unit, whereby the 10/100Base-T Ethernet signal associated with the first Ethernet switching unit and the 10/100Base-T Ethernet signal associated with the second Ethernet switching unit are delivered on a shared LAN cable connected to the RJ45 jack.

4. The Ethernet switch of claim 3, further comprising a power sourcing equipment (PSE) for providing inline power over the LAN cable.

* * * * *